Nov. 16, 1948.  E. N. MOLLIER  2,454,080
MOVING PICTURE FLASHING APPARATUS
Filed Aug. 9, 1946  3 Sheets-Sheet 1
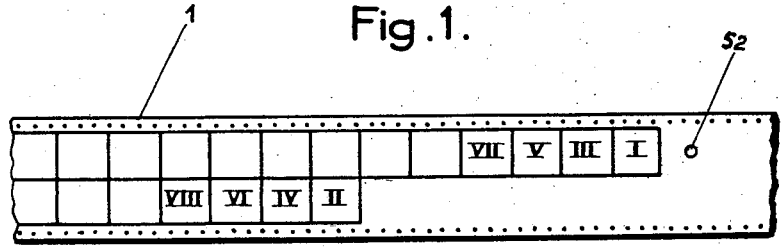
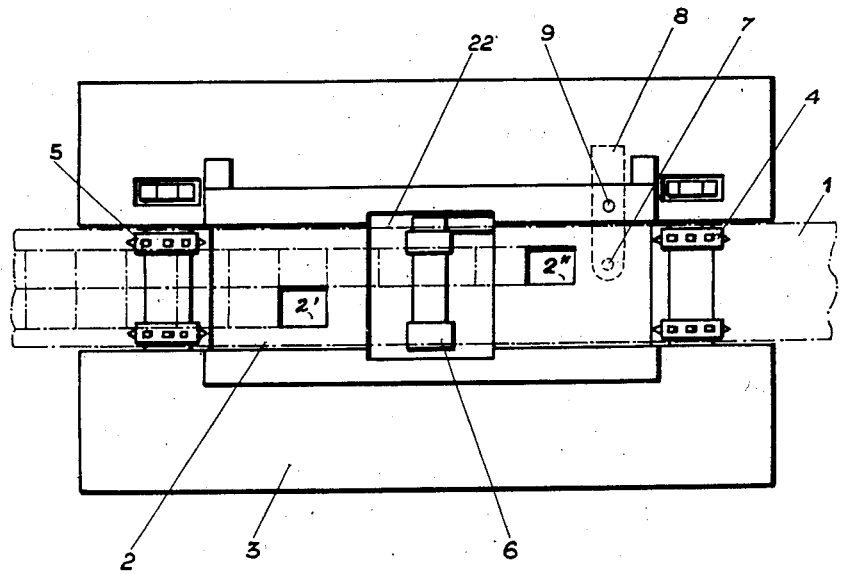

Nov. 16, 1948.    E. N. MOLLIER    2,454,080
MOVING PICTURE FLASHING APPARATUS
Filed Aug. 9, 1946    3 Sheets-Sheet 2

Nov. 16, 1948.   E. N. MOLLIER   2,454,080
MOVING PICTURE FLASHING APPARATUS
Filed Aug. 9, 1946   3 Sheets-Sheet 3

Patented Nov. 16, 1948

2,454,080

UNITED STATES PATENT OFFICE 2,454,080

MOVING PICTURE FLASHING APPARATUS

Etienne Noel Mollier, Paris, France

Application August 9, 1946, Serial No. 689,629
In France August 10, 1945

5 Claims. (Cl. 88—16.6)

This invention relates to a moving picture flashing apparatus which is particularly suitable for educational purposes whereby successive pictures can be flashed continuously upon a screen, one picture vanishing as the next one appears, in such manner that the total illumination of the screen shall remain constant, while moreover the said apparatus will enable to flash the successive pictures as slowly as desired without any flickering as well as to stop with the flashing and also to reverse the direction in which the film is fed.

For the aforesaid purposes, a camera is used which comprizes a pair of optical system adapted alternatingly to flash pictures printed in two parallel rows each of which occupies one half of the film standard 35 mm. width.

Flashed successively are pictures belonging alternatingly to one row and the other and which are offset on the film with respect to one another by a length that corresponds to the distances between the two optical systems plus as much of the film length as will suffice to form a loop which is needed by the fact that as the film is shifted lengthwise of the one gate by the height of one picture it remains stationary in the other gate.

The camera comprizes a horizontal channel for the guiding of the film and a pair of sprocket rolls, one at either end of said channel; moreover, provided midway of said channel is an aperture through which the film can be depressed by and bent over a roll which is pressed thereon by a spring.

A pair of gates are provided for the respective rows of pictures at one and the other end of the channel respectively.

A lid provided with presser springs and supporting the lenses is adapted to be closed upon the film.

Associated with either lens is a mirror set at an angle of 45° and designed to deflect the light rays horizontally in order that the pictures can be flashed upon a vertical screen.

The shutters are located between the light source and the film at the point where the image of the light source is formed by a first condenser, an arrangement that provides for the obtainment of a progressive variation in the brilliancy of the picture instead of the usual wiping out of the latter from one edge to the other. A further condenser is arranged to direct the light bundle towards the gate.

One shutter will open while the other closes in such manner that the brilliancy shall remain constant, whereby a film can be flashed as slowly as desired without any flickering effect.

The sprocket rolls are actuated by a Geneva movement, and one of them is designed to feed the film into the channel to shift the pictures across the first gate while the other is effective to pull the film out of the channel. The variations in the length of film within the channel are taken up by the variations in the extension of the loop.

The pictures are flashed alternatingly; as long as one picture is being flashed the shutter assigned to the other gate will remain closed while the film is shifted across the same; as soon as the shifting movement is completed the related shutter will begin to open while the other shutter begins to close, whereby constancy in the illumination of the screen is ensured while one picture fades away and the next one comes out.

The operation is exactly the same in reverse feed: the apparatus is strictly reversible.

An apparatus in accordance with this invention will now be described, reference being had to the appended drawing in which:

Figure 1 illustrates the arrangement of the prints on the film,

Figure 2 is a plan view of the channel for the film,

Figure 3:
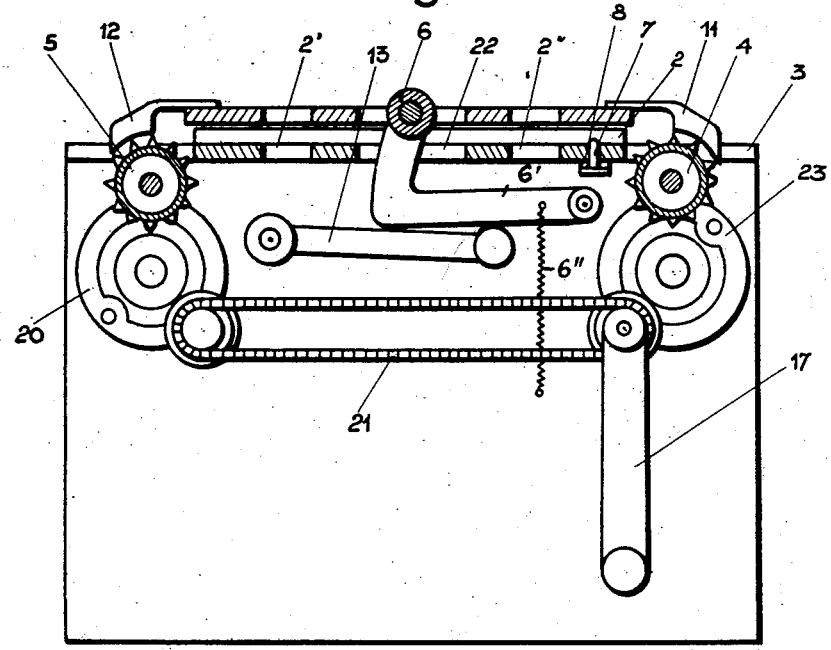
Figure 3 is a sectional view lengthwise of the channel.

As shown in Fig. 1 the prints are arranged in one even and one odd row at either side of the film 1, those in the even picture row being offset by six pictures with respect to those in the odd picture row. The film is laid into the channel 2 (Figs. 2 and 3) in the base plate 3 in which a pair of gates 2' and 2" are provided, then set into meshing engagement with the sprocket rolls 4 and 5 and passed below the loop roll 6 which is mounted at one end of a lever 6' which a spring 6" urges downwards; projecting through a perforation 52 in the film is a pin 7 which is carried by a spring lever 8 on which an additional pin 9 is secured, outside the channel, to be pressed down as the lid is closed, with the result that said pin 7 is disengaged from the perforation 52 in the film.

Figure 4:
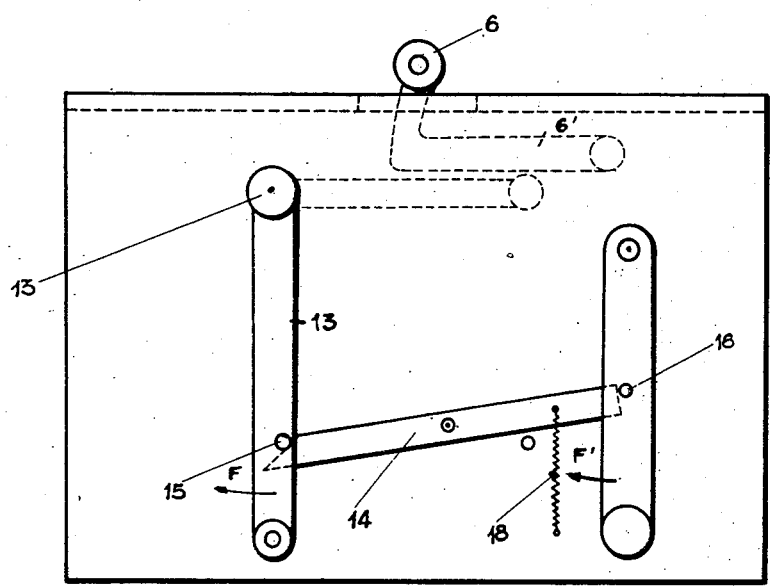
Figure 4 is an elevational view of the gear casing illustrating the crank locking means.

The lid carries a pair of presser springs 11 and 12 by which the film is kept in meshing engagement with the sprockets on rolls 4 and 5. Once the film is laid in position within the channel 2 the bell-crank lever 13 designed to keep the roller in raised position is swung in the direction shown by the arrow F (see Fig. 4), whereby said roller 6 is released and thus pressed into engagement with the film by the action of spring 6''; as a consequence, the locking lever 14 which up to that time was kept in locking engagement with a pin 16 on the crank 17 by a pin 15 on the roller-lifting lever 13 is snapped clear of said pin 16 by a spring 18; said crank 17 is thus released and can now be revolved in the direction shown by the arrow F'.

The first picture is then in flashing position. By revolving the crank 17 through half a revolution the dog-carrying disc 20 connected with the crank by an endless chain 21 rotates the sprocket roller 5 by an amount corresponding to the height of one picture; said roller feeds the film which with the aid of roller 6 forms a loop projecting through the aperture 22 in the base-plate; picture No. 2 is then in flashing position. By completing the revolution of the crank the dog-carrying disc 23 in its turn actuates the sprocket roller 4, whereby the loop roller is lifted by the film; picture No. 3 is flashed and the operation goes on in the same way.

By revolving the crank in the reverse direction the feed is also reversed.

Figure 5:
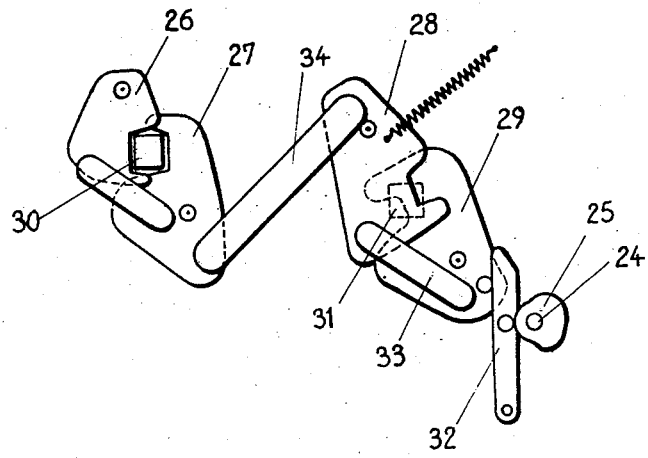
Figure 5 is a detail view of the shutter-actuating mechanism.

Keyed on the crank shaft 24 (Fig. 5) is a cam 25 for the actuation of the shutter mechanism which comprizes a pair of shutters 26, 27 assigned to gate 30 and a pair of shutters 28, 29 assigned to gate 31. Through the medium of lever 32 the cam acts upon shutter 29 which, by means of link 33, actuates the shutter 28 in the reverse direction, this resulting in the opening and closing of the gate 31. The shutter 27 for the opening and closing of gate 30 is actuated by shutter 27 through a link 34, so that one gate will open while the other closes and conversely.

Figure 6:
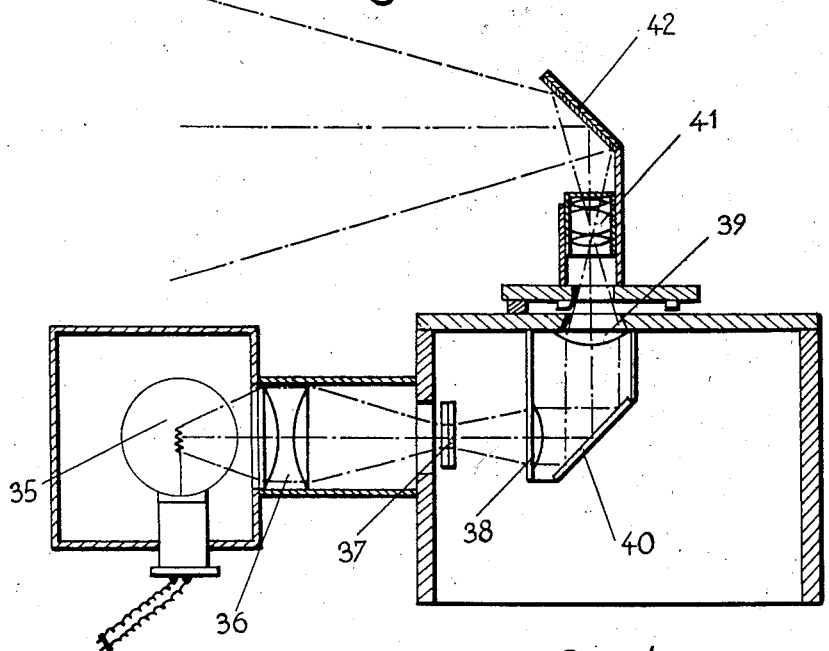
Figure 6 is a vertical sectional view of the apparatus illustrating the path of the light rays through the optical systems.

Figure 6 illustrates the optical system for the flashing of one row of pictures; arranged in front of the lamp 35 is a condenser 36 by which the image of the filament is formed in the gate 37, which is the point where the shutter is located; an additional condenser made up of lenses 38 and 39 and mirror 40 deflects the light spot formed in gate 37 towards the film. The lens 41 flashes the picture upon the screen through the medium of mirror 42. A similar arrangement is used for the other row of pictures.

I claim:

1. A moving picture apparatus comprising in combination a film bearing two rows of pictures to be flashed alternately, a film-guiding channel provided with a pair of spaced gates located respectively in front of the pictures of either row and with a transversal aperture between the two gates, a projection lens arranged before each gate, a sprocket roller at either end of the said channel adapted to feed the film through, a presser on each sprocket roller adapted to press the film upon the related roller, a guide roller midway of the channel in front of the film and of said transversal aperture in the channel, spring means to urge said roller towards the inside of said aperture and form a film loop, driving means to alternately rotate either roller through a fraction of a revolution in one direction or the other, means to alternately illuminate a picture in each row located in front of the corresponding gate, and means to progressively stop the illumination of one picture in one row while progressively illuminating the next picture in the other row.

2. A moving picture apparatus comprising in combination a film bearing two rows of pictures to be flashed alternately, a film-guiding channel provided with a pair of spaced gates located respectively in front of the pictures of either row and with a transversal aperture between the two gates, a projection lens arranged before each gate, a sprocket roller at either end of the said channel adapted to feed the film through, a presser on each sprocket roller adapted to press the film upon the related roller, a guide roller midway of the channel in front of the film and of the said transversal aperture in the channel, spring means to urge said roller towards the inside of said aperture and form a film loop, means to alternately rotate either roller through a fraction of a revolution in one direction or the other, a light source arranged behind each projection gate, a pair of condensers aligned on the optical axis between each light source and the related gate and spaced in such manner that the image of the light source is formed between the condensers of the pair, a progressive acting shutter arranged in the plane of the light source image between the two condensers, and means to simultaneously close one of the shutters and open the other synchronously with the passage of the related pictures.

3. A moving picture apparatus comprising in combination a film bearing two rows of pictures to be flashed alternately, a film-guiding channel provided with a pair of spaced gates located respectively in front of the pictures of either row and with a transversal aperture between the two gates, a projection lens arranged before each gate, a sprocket roller at either end of the said channel adapted to feed the film through, a presser on each sprocket roller adapted to press the film upon the related roller, a guide roller midway of the channel in front of the film and of the said transversal aperture in the channel, spring means to urge said roller towards the inside of said aperture and form a film loop, means to alternately rotate either roller through a fraction of a revolution in one direction or the other, a light source arranged behind each projection gate, a pair of condensers aligned on the optical axis between each light source and the related gate and spaced in such manner that the image of the light source is formed between the condensers of the pair, a progressive acting sector shutter arranged in the plane of the light source image between the two condensers, and means to simultaneously close one of the shutters and open the other synchronously with the passage of the related pictures.

4. A moving picture apparatus according to claim 1, further comprising means to move said guide roller towards the outside of said aperture against the action of the spring means to allow threading-in the film, and stop means adapted to cooperate with said guide roller lifting means and to stop the driving means for the sprocket rollers when the guide roller has been moved towards the outside of said aperture.

5. A moving picture apparatus according to claim 1, in which a registering hole is provided in the film, and further comprising a spring-pressed pin on the channel adapted to engage in said registering hole when the presser is out of engagement with the film feed rollers, and means cooperating with the presser to move the pin clear from the registering hole.

ETIENNE NOEL MOLLIER.

REFERENCES CITED

The following references are of record in the file of this patent:

UNITED STATES PATENTS

| Number | Name | Date |
|---|---|---|
| 620,357 | Prestwich | Feb. 28, 1899 |
| 861,832 | Haines | July 30, 1907 |
| 1,209,498 | Richard et al. | Dec. 19, 1916 |
| 1,247,646 | Craig | Nov. 27, 1917 |
| 1,258,226 | Kamowski | Mar. 5, 1918 |
| 1,291,954 | Lousey | Jan. 21, 1919 |
| 1,320,860 | Hunt | Nov. 4, 1919 |
| 1,642,918 | Bouin | Sept. 20, 1927 |
| 2,279,281 | Schensted | Apr. 7, 1942 |
| 2,328,239 | Wengel | Aug. 31, 1943 |